United States Patent [19]

Tusinski et al.

[11] Patent Number: 4,547,242
[45] Date of Patent: Oct. 15, 1985

[54] AUTOCLAVE FOR BONDING COMPOSITE LENSES

[75] Inventors: Joseph Tusinski; Phillip D. Hill, both of Muskogee, Okla.; John M. Griffith, Richmond, Va.

[73] Assignee: Coburn Optical Industries, Inc., Muskogee, Okla.

[21] Appl. No.: 493,546

[22] Filed: May 11, 1983

[51] Int. Cl.⁴ .................. B32B 17/10; B32B 31/20; B29C 17/04; B01J 3/04
[52] U.S. Cl. .................... 156/105; 156/285; 156/288; 156/382; 156/497; 422/208; 422/242; 220/236; 220/235; 211/80; 211/81; 211/73; 211/150; 211/169
[58] Field of Search .............. 156/105, 285, 288, 382, 156/497; 220/235, 236; 422/109, 208, 242; 211/40, 41, 73, 80, 81, 150, 169; 126/337; 269/312; 285/DIG. 19; 221/87, 88, 105

[56] References Cited

U.S. PATENT DOCUMENTS

| 1,226,023 | 5/1917 | Smith | 220/235 |
| 2,105,418 | 1/1938 | Hoffstetter et al. | 126/337 R |
| 2,116,170 | 5/1938 | Hall | 220/236 |
| 2,131,753 | 10/1938 | Reid | 422/242 |
| 2,260,710 | 10/1941 | Gschwind | 422/208 |
| 2,405,167 | 8/1946 | Royer et al. | 422/242 |
| 2,886,067 | 5/1959 | Maxwell et al. | 220/235 |
| 3,074,838 | 1/1963 | Little | 156/382 |
| 3,508,996 | 4/1970 | Hill | 156/382 |
| 3,547,589 | 12/1970 | Rice et al. | 422/242 X |
| 4,297,323 | 10/1981 | Tetzlaff et al. | 422/208 |

Primary Examiner—Edward Kimlin
Assistant Examiner—Ramon R. Hoch

[57] ABSTRACT

A small autoclave for bonding composite lenses comprising a cylindrical pressure vessel adapted to contain therein a lens tray for holding optical lenses aligned horizontally in a vertical array.

9 Claims, 7 Drawing Figures

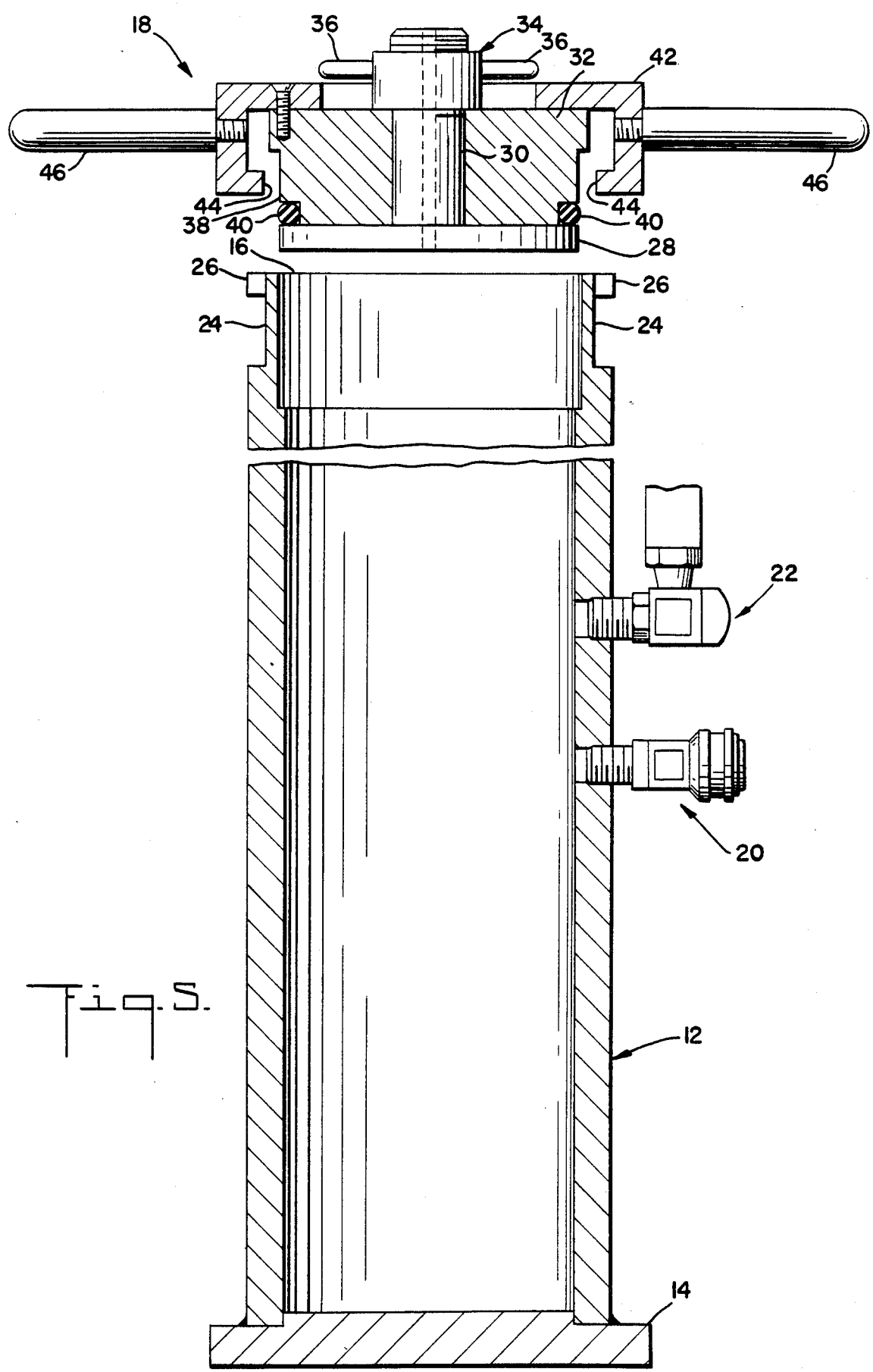

AUTOCLAVE FOR BONDING COMPOSITE LENSES

BACKGROUND OF THE INVENTION

This invention relates to a small autoclave and to a process for bonding composite lenses.

Ophthalmic and sunglass lenses have been used for many years. The optical industry has faced difficult problems in the manufacturing, handling and packaging of the optical glass materials. Such glasses are sensitive to mechanical stress, scratch easily and require the utmost care in handling to insure that a safe precision product is provided to the user. More recently the problems associated with manufacturing, handling and packaging of ophthalmic lenses became more difficult because of the use of composite materials for ophthalmic applications, namely, glass-plastic laminates. Generally, such composites are made of at least two materials: an inorganic glass lens prefinished by grinding and polishing to prescription on both of its major surfaces, and a composite organic material in the form of a thin film bonded to the glass lens and forming therewith the "uncut" form of the ophthalmic lens. If desired, the uncut lens is then tinted to various colors to provide luminous transmission characteristics thereto. For mounting, the completed lens is edge finished and installed in frames by conventional methods. The process for making such composite lenses generally includes the cleaning, drying and inspection of the inorganic glass surface, the positioning of the organic film material onto the glass lens, the lamination or bonding of the two components, dying or tinting the composite, and "fixing" the dye thereto.

In the above-described process the necessity of safe and convenient handling of the optical material should be apparent to those skilled in the optical art. Specifically, the highly polished active surfaces of the lens must remain free from contact with any hard surface whatsoever during the manufacturing, handling and storage thereof. It has been observed that when the active surfaces of an ophthalmic lens contact any hard substance they tend to become marred making subsequent processing steps futile, or in the finished product resulting in impaired efficacy of transmission of light therethrough.

One facet of composite lens manufacturing involves chemical and physical bonding of the plastic wafer to the prefinished glass lens accomplished under suitable conditions of heat and pressure. The combined effect of pressure and temperature must be adequate to eliminate gaseous inclusions and to develop sufficient adhesive forces between the plastic wafer and the glass. However, this effect cannot be excessive so as not to cause alterations in properties of the layers being laminated. For this reason, it is necessary to control the conditions of the lamination process.

It has been observed that large industrial sterilizers or autoclaves are not well suited for bonding composite lenses for reasons of economy and design. They are: not designed for small batch processing characteristic of lens manufacturing; expensive to operate with small batches; illsuited to homogeniously maintain proper temperature/pressure conditions therein; and not equipped with proper lens holders or carriers for preventing contact between optical surfaces of the lenses being autoclaved and the environment.

Accordingly, it is an object of the present invention to provide an autoclave equipped with a lens tray or holder.

It is another object of the invention to provide an autoclave in which pressure and temperature requirements are easily maintained.

It is a further object of the present invention to provide an autoclave adapted to small batch operations.

It is still another object of the present invention to provide a process for bonding composite lenses utilizing a small, safe and inexpensive autoclave.

SUMMARY OF THEE INVENTION

The object of the present invention are accomplished in a small autoclave of about two cubic feet or les volume comprising:

a pressure vessel or cylinder having a closed end and an open end, said closed end being upported by a base and said open end adapted to engage a closure means;

a closure means to engage and securely seal said opened end of the cylinder;

a charging valve means in said pressure cylinder for pressurizing the autoclave from an external source; and a safety valve in said pressure cylinder to release excess pressure.

Additionally, a thermocouple or thermometer and a presure gauge may also be used with the autoclave.

The autoclave is adapted to receive and hold a lens tray or holder for holding lenses aligned horizontally in a vertical array comprising:

vertically oriented pair of parallel rods one end of said pair of rods being supported by a flat disk while the other end is equipped with a handle for carrying the tray;

a plurality of lens support members aligned horizontally and spaced vertically from each other individually mounted by hinges onto one of said parallel rods, said hinges enabling individual motion of each of said lens support members in the horizontal plane for stacking a lens thereon, said lens support members having engaging means opposite of said hinges to engage the other of said parallel rods.

In the practice of the present invention the lens tray, stacked with the composite lenses having at least two layers, is placed in the autoclave. After closing the cover, the autoclave is pressurized from an external gas or compressor source, placed in a conventional over or other convenient heating apparatus and heated and cooled through the desired time-temperature cycle. Monitoring is accomplished through standard instrument measuring temperature and pressure.

The invention is described in connection with the preferred embodiment illustrated in the accompanying drawings that follow.

BRIEF DESCRIPTION OF THE DRAWINGS

FIG. 5 is an exploded cross section of FIG. 3 without the lens tray.

DETAILED DESCRIPTION OF THE INVENTION

Figure 1:
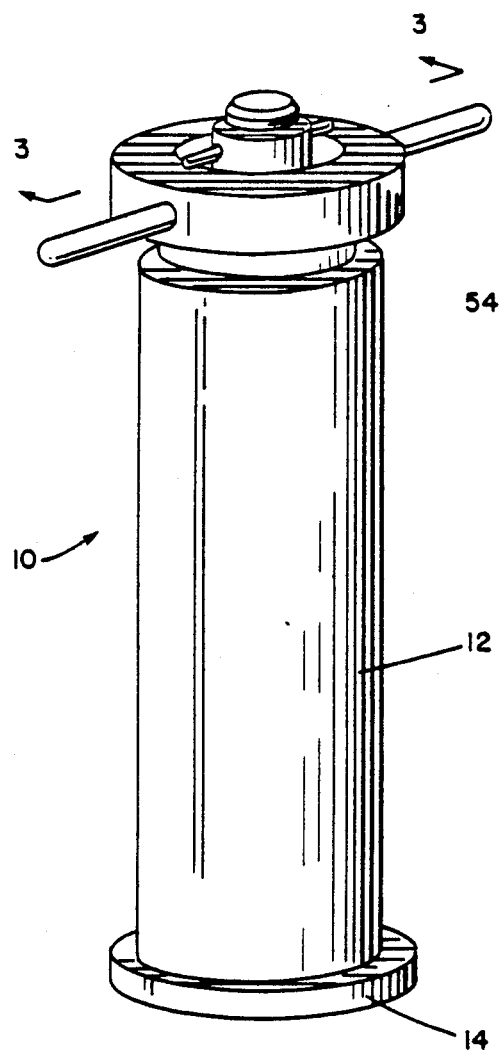
FIG. 1 is a perspective view of the small autoclave of the present invention.
Figure 6:
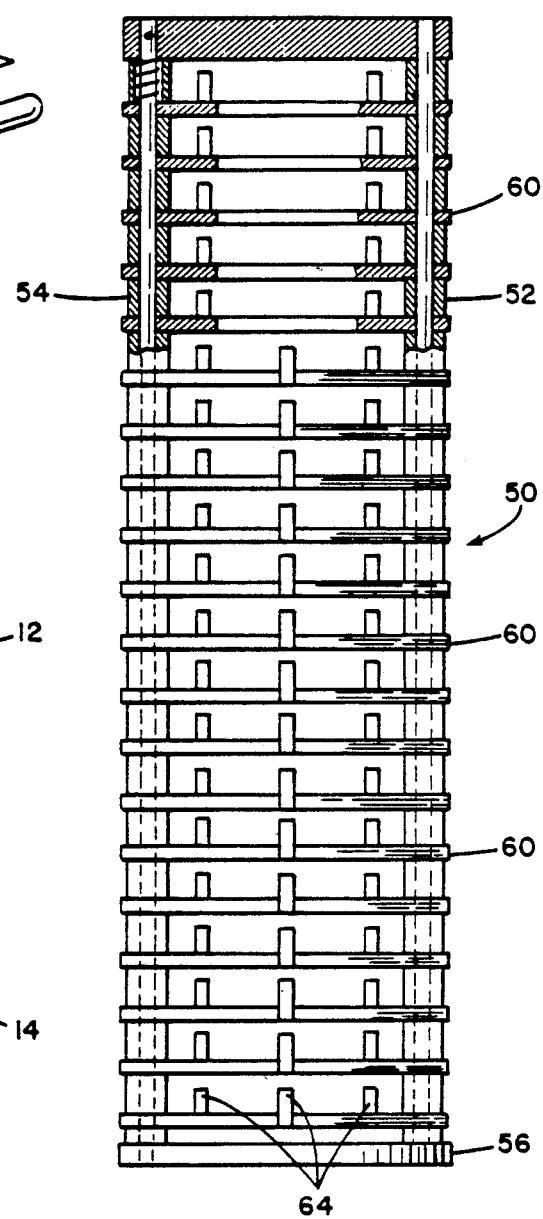
FIG. 6 is an elevational view of the lens tray used in the small autoclave.
Figure 4:
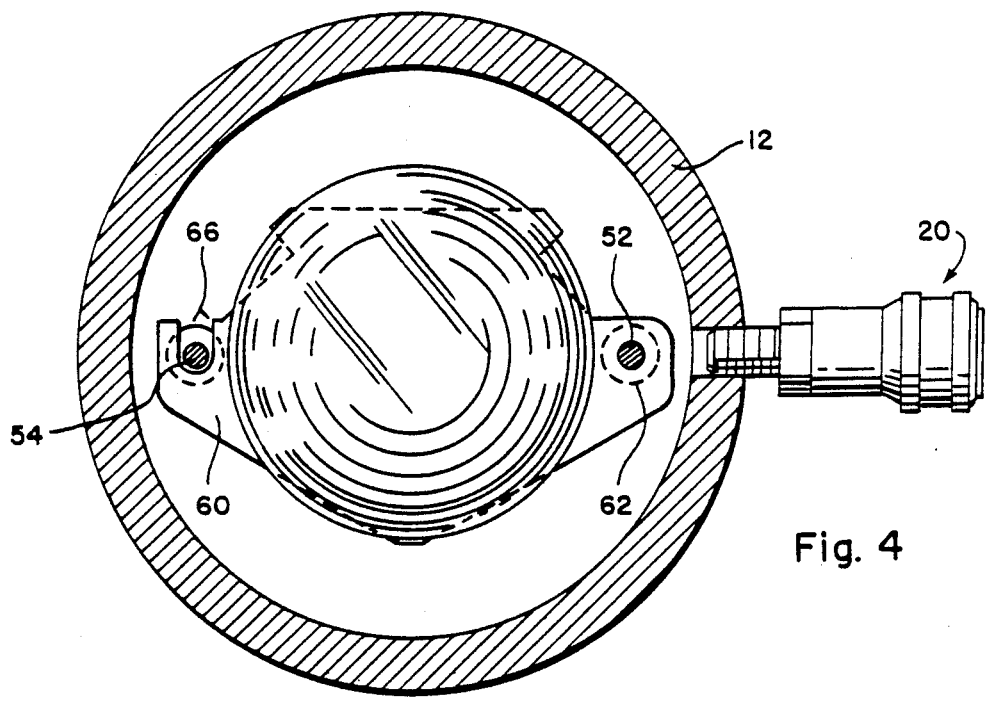
FIG. 4 is a sectional view through the autooclave of FIG. 1 on a horizontal plane along line 4—4 of FIG. 3.
Figure 2:
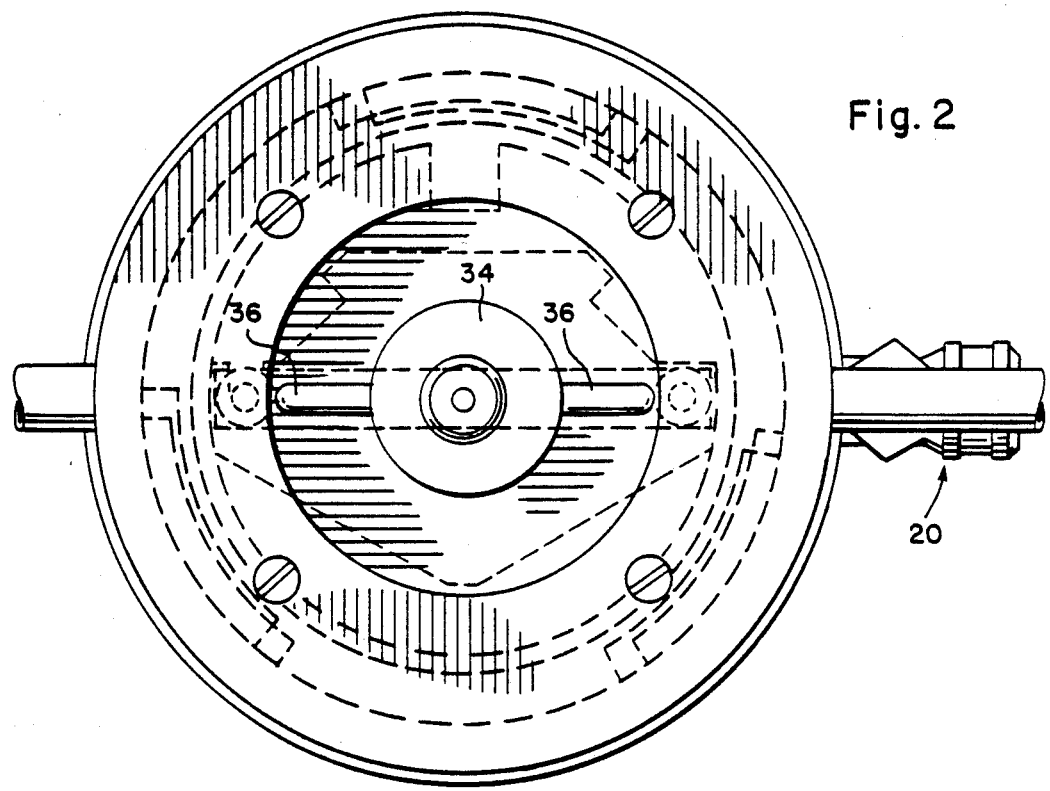
FIG. 2 is a top view of the autoclave.
Figure 3:
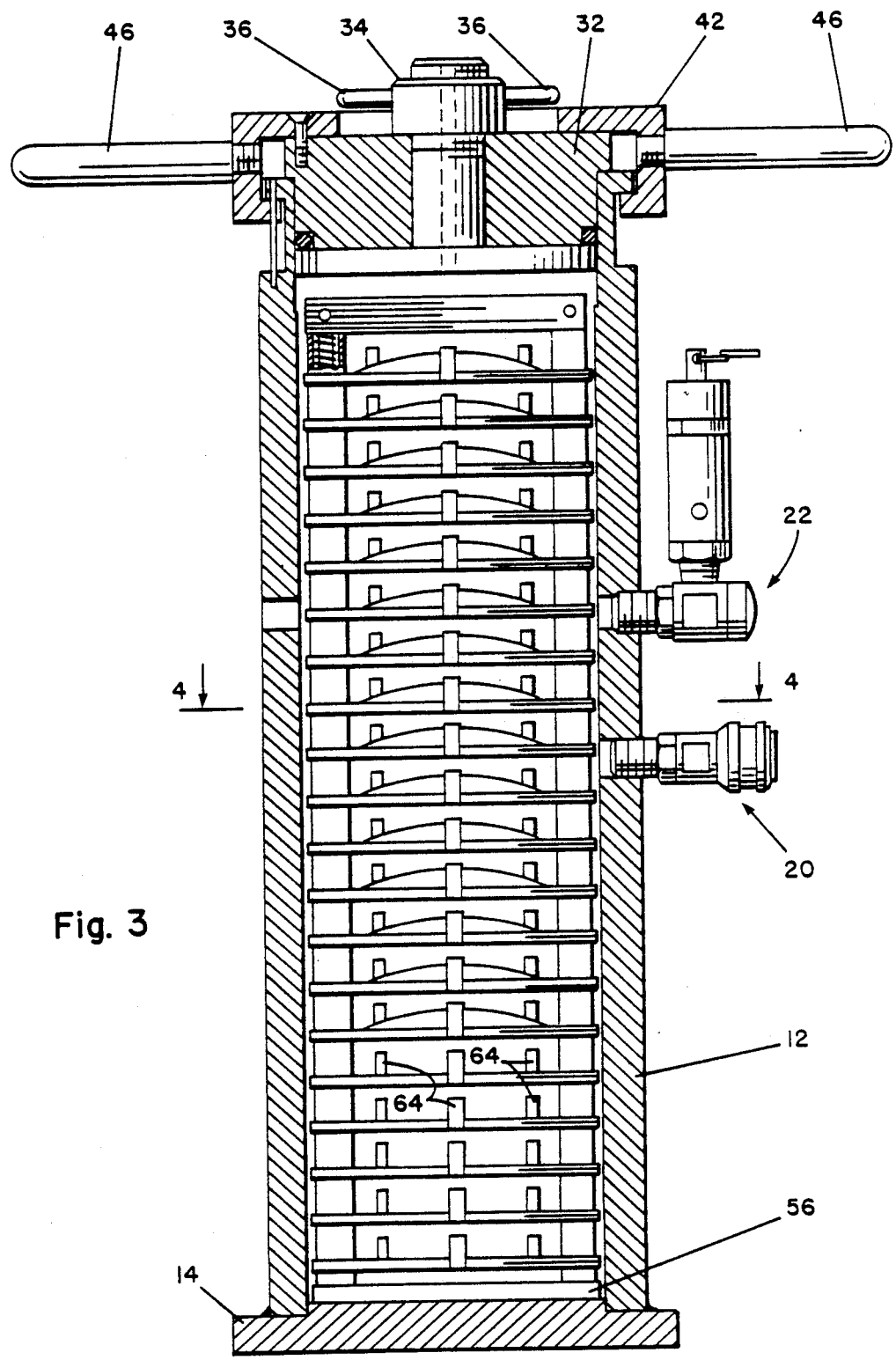
FIG. 3 is a side sectional view through the autoclave of FIG. 1 having the lens tray therein on a vertical plane taken along line 3—3.

Referring generally to a preferred embodiment of the present invention, FIG. 1 shows the small autoclave 10 made of metal, such as steel, aluminum, brass or various alloys. The small autoclave 10 comprises, as shown in FIG. 5, a pressure cylinder 12 having a closed end supported by base 14 on one end thereof and open top end 16 adapted to engage closure means 18. Autoclave 10 is adapted to securely hold lens tray or lens holder 50, shown in FIGS. 6 and 7, made of metal or metal alloys.

Referring specifically to the preferred embodiment of the present invention, autoclave 10 is equipped with charging valve 20 through which fluids, such as steam, nitrogen or helium, may be introduced into the autoclave to attain the required pressure. Spaced from said charging valve 20 is safety valve 22 to provide for release of excessive pressure and insure safety of operating personnel and equipment. Open top end 16 of autoclave 10 is beveled 24 and has a plurality of protuding first lugs 26 thereon, as shown in FIG. 5. Closure means 18 comprises: compression lid 28 integral with male threaded member 30, said male threaded member 30 infixed in closure head member 32 and protruding therefrom to receive female threaded member 34; closure head member 32 is beveled to form "O" ring retainer to accomodate and "O" ring and retain the same between it and compression lid 28; female threaded member 34 is equipped with a first pair of turn ears 36 to facilitate turning of female threaded member 34 on male threaded member 30; "O" ring 40 of an elastic material such as rubber or plastic, is held in position by compression lid 28 and "O" ring retainer 38; pressure lock ring 42 having inwardly protruding second lugs 44 thereon, said second lugs to engage said first lugs 26, located on top end 16 of the autoclave 10, upon closing of the autoclave; and a second pair of turn ears 46 mounted on pressure lock ring 42 to facilitate easy engagement of first lugs 26 with second lugs 44.

Figure 7:
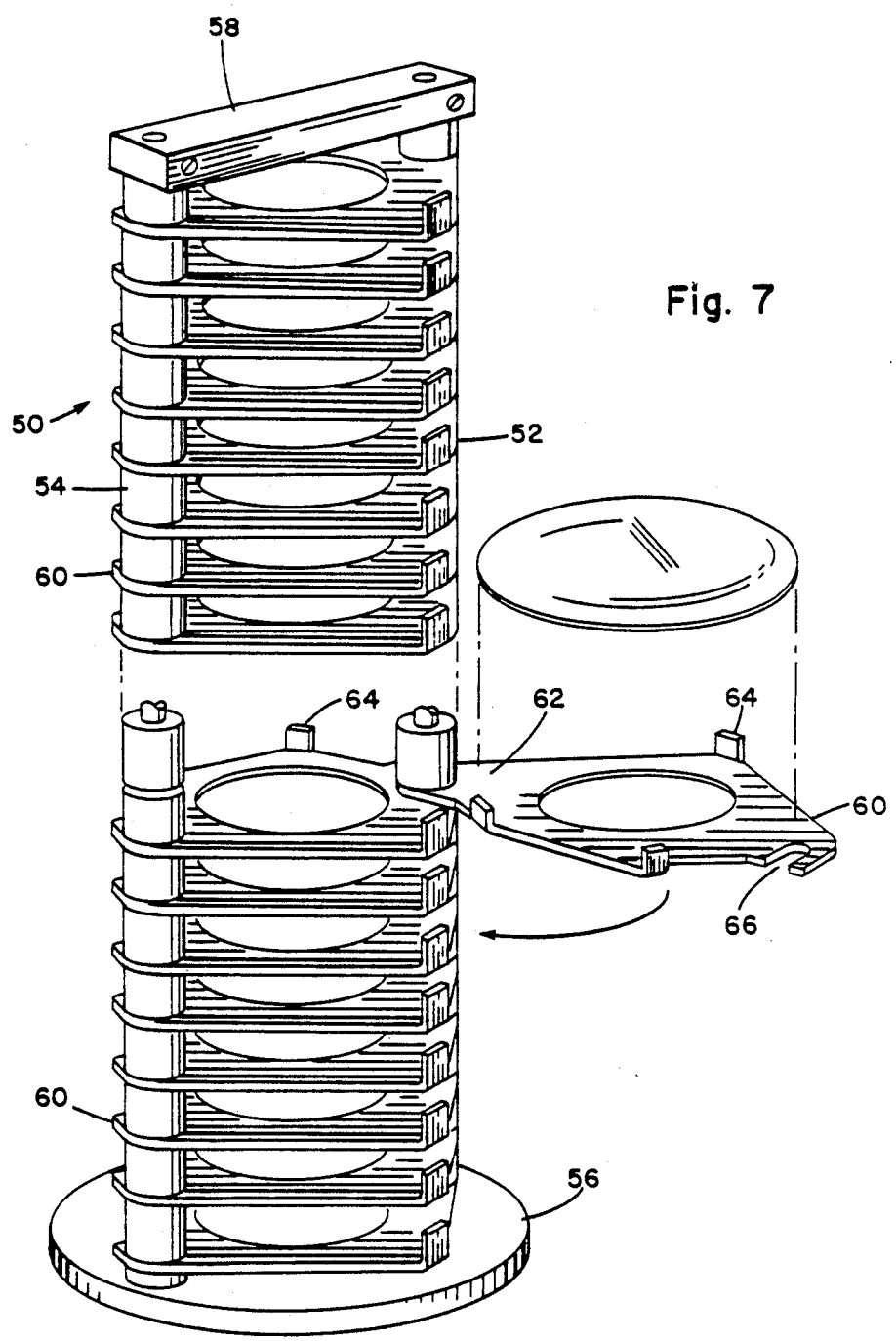
FIG. 7 is an exploded perspective view of the lens tray shoving one of the lens support members in an open position to receive and hold a lens thereon.

Referring to lens tray 50 used as an integral part of autoclave 10 in bonding composite lenses, the same is designed to hold lenses aligned horizontally in a vertical array comprising:

a pair of vertically oriented parallel rods 52 and 54 one end thereof being supported by flat disk 56, while the other end thereof is equipped with handle 58 for carrying the tray; and a plurality of lens support members 60 aligned horizontally and spaced vertically from each other individually mounted by hinge 62 (as best seen in FIG. 7) on rod 54 enabling motion of said lens support members in the horizontal plane for stacking lenses thereon, each of said lens support member 60 being generally of flat shape having a centrally located circular cut out portion and having lens retaining means 64 perpendicular thereto and spaced from each other, opposite of hinge 62 each of said lens support member 60 has a generally u-shaped engaging means 66 to engage rod 54.

In using the apparatus of the present invention lens tray 50 is stacked with composite lenses to be bonded by individually disengaging from rod 54 and swinging outward therefrom each of lens support members 60 as shown in FIG. 7 and stacking lenses thereon. The active surfaces of the composite lenses do not contact the lens support members to avoid abrasion thereof. Lens retaining means 64 prevent the lenses from moving and sliding off from lens support members 60, however, they allow sufficient "play" or movement for positioning and removing the lenses. Further advantages of the lens support members include: their configuration allowing easy removal of lenses therefrom by holding the lenses at their non-active surfaces; and the provision for individual mounting, opening and closing of the lens support members which allows for easy stacking and unstacking of lenses without the necessity of sliding the lenses into position thereby risking contact and abrasion of the active surfaces thereof.

Upon completing stacking of the lenses, the indiviidual lens support means 60 are closed so as to engage u-shaped engaging means 66 with rod 54. Lens tray 50 is placed into autoclave 10 and closure means 18 is locked into position as follows. With a turning motion second lugs 44 are positioned between first lugs 26 thereby inserting compression lid 28, O ring 40, and O ring retainer 38 into top end 16 of autoclave 10. After insertion, closure means 18 is turned the distance between two lugs, which is about ⅓ of a complete revolution, by using as a handle second pair of turn ears 46. This turning motion results in second lugs 44 engaging first lugs 26. Thereafter, female threaded member 34 is tightened up by turning the same clockwise, using first pair of turn ears 36. In tightening female threaded member 34, male threaded member 32 is pulling compression lid 28 and pressing O ring 40 against O ring retainer 38. In its relaxed state O ring 40 snuggly touches the inside surface of autoclave 10. Upon its vertical compression between compression lid 28 and O ring retainer 38, it is uniformly deformed in a horizontal direction pressing against the inside surface of the autoclave 10 thereby providing an air-tight seal between closure means 18 and autoclave 10.

After closing, the autoclave is charged with a suitable fluid, such as air, steam, nitrogen or helium via charging means 20 from an external source, placed in a heating apparatus, such as an oven, and is subjected to a pressure-temperature cycle to accomplish joining of the components of the composite lens. The pressure-temperature conditions in the cycle should be tailor-made to the properties of the component used in the composite lens and may widely vary according to such properties. Such tailoring of the conditions are, however, within the capabilities of those skilled in the art and the apparatus of the present invention may be used under such varying conditions. A typical process, tailored to a two-component laminate, illustrating the utilization of the apparatus of the present invention follows.

A prefinished inorganic glass lens ground and polished to prescription on both acctive surfaces is prepositioned and prelaminated to a composite organic polyurethane wafer, which is in the form of a clear film of less than one mm thickness and placed in the autoclave for permanently bonding of the glass and plastic components. After charging the autoclave with a fluid, the autoclave is heated by an external heat source and the internal pressure of the autoclave is controlled by the external heat source. It has been found that a minimum pressure of about 120 psi (8 bars) is necessary for the adhesive forces to develop adequately between the film and the glass. The maximum presure which may be applied is limited only by the equipment design and material strength. It was also found that the minimum temperature of about 200° F. is also necessary, in addition to maintaining the required pressure, to obtain satisfactory adhesions. Similarly, an upper temperature limit of about 280° F. should not be exceeded since above this temperature the properties of the film tend to deleteriously alter. The preferred operating temperature was found to range between 240° F. to 270° F. The pressure-temperature cycle to accomplish adequate bonding of the components varies between 30 to 200 minutes, after which the bonded laminates is tinted if desired, inspected and packaged for sale.

While a particular embodiment of the invention has been shown and discribed, it is apparent that many modifications may be made and it is intended in the appended claims to cover all such modifications as may fall within the spirit and scope of the invention.

What is claimed is:

1. A small autoclave for bonding composite lenses comprising:
   a pressure cylinder having a closed end and an open end, said closed end being supported by a base and said open end adapted to engage a closure means;
   a closure means to engage and seal said open end of said pressure cylinder;
   a charging valve means in said pressure cylinder for pressurizing the autoclave from an external source;
   a safety valve in said pressure cylinder to release excess pressure;
   a lens tray contained in said autoclave for holding lenses aligned horizontally in a vertical array comprising a vertically oriented pair of parallel rods one end of said pair of parallel rods being supported by a flat disk while the other end having a handle for carrying the tray, and a plurality of lens support members aligned horizontally and spaced vertically from each other individually mounted by hinges onto one of said parallel rods, said hinges enabling individual motion of each of said lens support members in the horizontal plane for stacking a lens thereon, said lens support members having engaging means opposite of said hinges to engage the other of said parallel rods.

2. The small autoclave of claim 1 wherein said closure means comprises:
   a compression lid;
   a male threaded member integral with said compression lid;
   a closure head member having a beveled portion to retain an O ring and to receive said male threaded member;
   a female threaded member mounted on said male threaded member;
   an O ring held in position by said closure head member and said compression lid; and
   pressure lock ring integral with said closure head member having inwardly protuding lugs thereon for engaging corresponding lugs on top of pressure cyllinder.

3. The small autoclave of claim 2 wherein said pressure lock ring further comprises a pair of turn ears.

4. The small autoclave of claim 2 wherein said female threaded member further compriss a pair of turn ears.

5. The small autoclave of claim 1 wherein each of said lens support members contain lens retaining means spaced from each other and perpendicular to said lens support member.

6. A method for bonding composite lenses comprising the steps of:
   stacking prelaminated glass-plastic composite lenses onto a lens tray comprising a vertically oriented pair of parallel rods one end of said pair of parallel rods being supported by a flat disk while the other end having a handle for carrying the tray, and a plurality of lens support members aligned horizontally and spaced vertically from each other individually mounted by hinges onto one of said parallel rods, said hinges enabling individual motion of each of said lens support members in the horizontal plane for stacking a lens thereon, said lens support members having engaging means opposite of said hinges to engage the other of said parallel rods;
   placing said lens tray into the autoclave of claim 4;
   pressurizing said autoclave with a fluid through said charging valve means;
   bonding said glass-plastic composite by heating said autoclave.

7. The method claim 6 wherein said heating is at a temperature of 200° to 280° F.

8. The method of claim 6 wherein said pressurizing and heating steps result in a pressure of at least 120 psi.

9. The method of claim 6 wherein said heating step is maintained for about 30 to 200 minutes.

* * * * *